United States Patent
Shigeta et al.

(10) Patent No.: US 8,206,615 B2
(45) Date of Patent: Jun. 26, 2012

(54) PASTE FOR EMISSION SOURCE AND ELECTRON EMISSION ELEMENT

(75) Inventors: Kazuki Shigeta, Otsu (JP); Takejiro Inoue, Otsu (JP); Atsushi Ikeda, Otsu (JP); Kazuki Goto, Otsu (JP)

(73) Assignee: Toray Industries, Inc., Tokyo (JP)

( * ) Notice: Subject to any disclaimer, the term of this patent is extended or adjusted under 35 U.S.C. 154(b) by 140 days.

(21) Appl. No.: 12/449,777

(22) PCT Filed: Feb. 20, 2008

(86) PCT No.: PCT/JP2008/052796
§ 371 (c)(1),
(2), (4) Date: Aug. 26, 2009

(87) PCT Pub. No.: WO2008/105278
PCT Pub. Date: Sep. 4, 2008

(65) Prior Publication Data
US 2010/0096972 A1 Apr. 22, 2010

(30) Foreign Application Priority Data
Feb. 26, 2007 (JP) ................................ 2007-045117

(51) Int. Cl.
*H01B 1/22* (2006.01)
(52) U.S. Cl. .................................. 252/518.1; 252/520.1
(58) Field of Classification Search .................. 252/500, 252/502, 512
See application file for complete search history.

(56) References Cited

U.S. PATENT DOCUMENTS

| 2005/0008861 A1* | 1/2005 | Yadav et al. .................. 428/403 |
| 2005/0231091 A1* | 10/2005 | Bouchard et al. ............. 313/311 |
| 2007/0096617 A1* | 5/2007 | Hwang ........................ 313/310 |
| 2007/0252508 A1* | 11/2007 | Kim et al. ..................... 313/310 |
| 2008/0122337 A1* | 5/2008 | Cho ......................... 313/346 R |
| 2008/0164801 A1* | 7/2008 | Min et al. ..................... 313/309 |
| 2009/0012200 A1* | 1/2009 | Ittel ............................... 522/71 |

FOREIGN PATENT DOCUMENTS

| JP | 2001-319560 | 11/2001 |
| JP | 2005025970 A | * 1/2005 |

OTHER PUBLICATIONS

Machine translation of JP 2005025970.*
Office Action issued Nov. 28, 2011, in Japanese Patent Application No. 2007-214420.

* cited by examiner

Primary Examiner — Mark Kopec
(74) Attorney, Agent, or Firm — Kubovcik & Kubovcik

(57) ABSTRACT

An object of the present invention is to provide a paste for an electron emission source, which can retain good electric contact between CNT and a cathode electrode, by containing an electrically conductive particle having a particle diameter within the optimal range. A paste for an electron emission source containing a carbon nanotube having a diameter of 1 nm or more and less than 10 nm, and an electrically conductive part having an average particle diameter of 0.1 to 1 μm.

9 Claims, No Drawings

PASTE FOR EMISSION SOURCE AND ELECTRON EMISSION ELEMENT

This application is a 371 of international application PCT/JP2008/052796, filed Feb. 20, 2008, which claims priority based on Japanese patent application No. 2007-045117 filed Feb. 26, 2007, which is incorporated herein by reference.

TECHNICAL FIELD

The present invention relates to a paste for an electron emission source, and an electron emission element using it.

BACKGROUND ART

Since a carbon nanomaterial having a sharp-pointed tip shape and the high aspect ratio including a carbon nanotube (hereinafter, referred to as CNT) is suitable for field emission, many developments have been conducted as a field emission display (FED) or an electron release source such as a backlight for a liquid crystal using field emission. The electron emission source using CNT can be manufactured by printing a paste obtained by mixing CNT with a binder and an organic component such as a solvent and the like, on a cathode electrode, followed by firing.

In order that CNT effectively emits an electron, good electric contact between CNT and a cathode electrode is important. However, due to the presence of an insulating component such as amorphous carbon which is the firing residue of impurities of CNT and organic components, and a glass powder which is added for imparting adhering property between a cathode electrode and CNT, good electric contact is inhibited in some times.

Then, the technique of imparting electrical conductivity by mixing a silver particle so as to retain electric contact has been published (see Patent Document 1). In addition, the technique regarding a paste for an electron source containing at least a metal fine particle or a metal oxide fine particle having the particle diameter which is approximately 10-fold or less of the wire diameter of a needle-like substance such as CNT, in the needle-like substance such as CNT having the wire diameter of approximately 100 nm or less, for the purpose of uniformly dispersing CNT without bundling has been disclosed (Patent Document 2).

However, in the technique disclosed in Patent Document 1, electric contact with a cathode electrode of CNT could not be preferably retained depending on the particle diameter of a silver particle, in some cases. In addition, also in the technique disclosed in Patent Document 2, since the particle diameter of a metal fine particle, or metal oxide having electrical conductivity is small, this did not lead to better electric contact.

[Patent Document 1] Japanese Patent Application Laid-Open (JP-A) No. 2004-504690 (paragraph 21)
[Patent Document 2] JP-A No. 2005-222847 (claims 1, 2)

DISCLOSURE OF THE INVENTION

Problems to be Solved by the Invention

Paying an attention to the above-described problems, an object of the present invention is to provide a paste for an electron emission source, which can retain good electric contact between CNT and a cathode electrode, by containing an electrically conductive particle having the particle diameter in the optimal range.

Means to Solve the Problems

That is, the present invention is a paste for an electron emission source containing a carbon nanotube having a diameter of 1 nm or more and less than 10 nm, and an electrically conductive particle having the average particle diameter of 0.1 to 1 μm.

Effect of the Invention

According to the present invention, by containing an electrically conductive particle having the particle diameter in the optimal range, a paste for an electron emission source which can retain good electric contact between CNT and a cathode electrode can be provided.

BEST MODE FOR CARRYING OUT THE INVENTION

The present invention will be explained in detail below. CNT is not only excellent in physical/chemical durability, but also has a tip shape having the small curvature and the large aspect ratio suitable for field emission. Therefore, CNT is preferably used as an electron emission material. In addition to CNT, a carbon nanofiber, a carbon nanowall, a carbon nanohorn, or a carbon nanocoil may be used. When a diameter of CNT grows large, since the curvature of a tip which is an electron emission part becomes large, the application voltage necessary for electron emission become high, therefore, it is important that CNT having a diameter of 1 nm or more and less than 10 nm is contained. By inclusion of CNT smaller than 10 nm, the voltage necessary for electron emission can be lowered. However, when CNT is smaller than 1 nm, electron is easily emitted, but a paste is easily deteriorated. More preferably, the diameter of CNT is 1 nm or more to 7 nm or less. By making the diameter 7 nm or less, the voltage necessary for electron emission can be further lowered. The diameter of CNT can be measured with a transmission electron microscope.

Herein, good electric contact refers to a resistance between CNT on a surface of an electron emission source, and a cathode electrode of $10^9 \Omega$ or less. Since a specific resistance of monolayer CNT is said to be $10^{-2}$ to $10^{-4} \Omega$ cm (J. -P. Issi and J. -C. Charlier, Electrical Transport Properties in Carbon Nanotubes In The Science and Technology of Carbon Nanotubes, ed. K. Tanaka, T. Yamabe, and K. Fukui, Elsevier, UK, 1999), when the length of CNT having a diameter of 1 nm is 1 μm, the resistance of CNT becomes $10^5$ to $10^7 \Omega$. Since the greater length of CNT is also included, there is influence of an insulating impurity such as amorphous carbon, and there is the contact resistance at a contact point between different CNTs, or a contact point between CNT and an electrode, when the resistance is $10^9 \Omega$ which is 100-fold or less of the resistance of one CNT of $10^7 \Omega$, this can be said to be good electric contact. More preferable is $10^7 \Omega$ or less.

The content of CNT relative to a whole paste for an electron emission source is preferably 0.1 to 20% by weight. In addition, the content is more preferably 0.1 to 10% by weight, and further more preferably 0.5 to 5% by weight. When the content of CNT is in the above described range, dispersibility of CNT in the paste for an electron emission source, printing property and uniform pattern forming property of the paste on a substrate, and property of electron emission from a CNT emitter become better, being particularly preferable.

In the present invention, an electrically conductive particle having the average particle diameter of 0.1 to 1 μm is used. When the average particle diameter of the electrically conductive particle is less than 0.1 μm, the number of contact points of the electrically conductive particle is increased, and conversely the resistance is increased. This is presumed that since amorphous carbon such as the burning residue of an organic component such as a binder is deposited on contact points in many cases, when the number of contact points is increased, the resistance between electrically conductive particles is added by the number of contact points, and the series resistance is increased. In addition, when the particle diameter is greater than 1 μm, irregularities on the surface become great, and it becomes difficult to obtain uniform electron emission. More preferably, the average particle diameter of the electrically conductive particle is 0.1 to 0.6 μm. When the particle diameter is 0.6 μm or less, irregularities on the surface can be further decreased.

The contact resistance between CNT and a cathode electrode can be measured using a scanning extension microscope. The resistance value is measured by contacting a Co—Cr-coated silicon cantilever with an emitter surface, and applying a DC bias to a cathode electrode. For measurement, a commercially available scanning extension resistance microscope (e.g., NanoScope IIIa AFM Dimension3100 Stage System manufactured by Veeco, Digital Instruments) is used.

Alternatively, the average particle diameter of an electrically conductive particle can be measured with a fluid-process type BET single point method specific surface area measuring apparatus (MONOSORB manufactured by Yuasa Ionics Inc.) using $N_2$ as an adsorption gas, and $N_2/He=30/70$ as a carrier gas. The average particle diameter of the electrically conductive particle refers to a value obtained from the following equation using the specific surface area ($m^2/g$) and the density ($g/cm^3$) obtained by the fluid-process type BET single point method. Average particle diameter=6/(density× specific surface area)

The electrically conductive particle is not particularly limited, as far as it has electrical conductivity, but is preferably a particle containing electrically conductive oxide, or a particle in which a part or all of the oxide surface is coated with an electrically conductive material. This is because a metal has the high catalyst activity and, when a temperature becomes a high temperature by firing or electron emission, the metal deteriorates CNT in some cases. As the electrically conductive oxide, indium/tin oxide/(ITO), tin oxide, and zinc oxide are preferable. Alternatively, titanium oxide, or silicon oxide in which a part or all of the surface of oxide is coated with ITO, tin oxide, zinc oxide, gold, platinum, silver, copper, palladium, nickel, iron, or cobalt is preferable. Also in this case, as a coating material of the electrically conductive material, electrically conductive oxide such as ITO, tin oxide, and zinc oxide is preferable.

The addition amount of the electrically conductive particle in the paste for an electron emission source is preferably an electrically conductive particle 0.1 to 100 parts by weight, and further more preferably 0.5 to 50 parts by weight based on 1 part of CNT. When the addition amount of the electrically conductive particle is within the above range, electric contact between CNT and a cathode electrode becomes further preferable, being particularly preferable.

It is preferable that the paste for an electron emission source of the present invention further contains a glass powder. The glass powder is sintered at firing to form a matrix, thereby, CNT can be adhered to a substrate.

Since CNT is fired at a temperature of 500° C. or lower for the purpose of preventing deterioration at firing in many cases, it is preferable to use a low softening point glass having the softening point of 500° C. or lower in order to form a matrix by sintering. However, a lead-based glass that is a representative low softening point glass is not preferable from a viewpoint of environment load. Therefore, it is preferable to use a bismuth-based glass having small environmental load. Alternatively, based on the same reason, it is also preferable to use an alkali-based glass. The softening point of a glass referred herein is obtained from a DTA curve obtained by heating 100 mg of a glass sample at 20° C./min in the air using a differential thermal analysis (DTA) method, and plotting a temperature on an abscissa axis, and a heat amount on an ordinate axis.

Herein, the average particle diameter of the glass particle refers to an accumulation 50% particle diameter ($D_{50}$). This indicates the particle diameter at a point where a volume accumulation curve becomes 50%, when the volume accumulation curve is obtained letting the total volume of a population of one powder to be 100%. This is generally utilized as one of parameters for assessing the particle size distribution as the accumulation average diameter. In addition, the particle size distribution of the glass powder can be measured by a microtrack method (a method with a microtrack laser diffraction-type particle size distribution measuring apparatus, manufactured by Nikkiso Co., Ltd.).

As the bismuth-based glass, for example, a glass powder having 45 to 86% by weight of bismuth oxide, 0.5 to 8% by weight of silicon oxide, 3 to 25% by weight of boron oxide, and 0 to 25% by weight of zinc oxide is preferable in stability of the glass, and easy control of the softening point. By adopting the content of silicon oxide of 0.5 to 8% by weight, stability of the glass can be improved. When the content is less than 0.5% by weight, the effect is insufficient and, when the content is more than 8% by weight, the softening point of the glass becomes too high. More preferably, the content is 0.5 to 2% by weight. Also by adopting the content of boron oxide of 3 to 25% by weight, stability of the glass can be improved. When the content is less than 3% by weight, the effect is insufficient and, when the content is more than 25% by weight, the softening point of the glass becomes too high. More preferably, the content is 3 to 10% by weight. Zinc oxide may not be contained, but by inclusion up to 25% by weight, the softening point can be lower. When the content is more than 25% by weight, the glass becomes unstable. More preferably, the content is 5 to 15% by weight. In addition, aluminum oxide, sodium oxide, calcium oxide, magnesium oxide, selenium oxide, potassium oxide and the like can be contained.

As the alkali-based glass, a glass powder having 3 to 15% by weight of lithium oxide, sodium oxide or potassium oxide, 2 to 15% by weight of magnesium oxide or calcium oxide, 20 to 45% by weight of boron oxide, 10 to 25% by weight of aluminum oxide, 5 to 30% by weight of silicon oxide, 2 to 15% by weight of barium oxide or strontium oxide, and 0 to 5% by weight of zinc oxide is preferable in stability of the glass, and easy control of the softening point.

By adopting the total amount of alkali metal oxide of 3% by weight or more, the effect of lowering the melting point of the glass can be obtained and, by adopting the total amount of 15% by weight or less, chemical stability of the glass can be maintained. It is preferable that calcium oxide and magnesium oxide are incorporated in order to easily melt the glass. It is preferable that calcium oxide and magnesium oxide are incorporated at the total amount of 2 to 15% by weight. By adopting the total amount of 2% by weight or more, crystallization of the glass can be prevented and, by adopting the total amount of 15% by weight, chemical stability of the glass can be maintained.

Boron oxide can suppresses the glass transition point and the softening point low and baking onto a glass substrate is made easy by setting an amount of 20% by weight or more. On the other hand, by setting the amount of 45% by weight or less, chemical stability of the glass can be maintained.

Aluminum oxide has an effect of expanding the vitrifying range to stabilize the glass, and is also effective in extending a pot life of the paste. It is preferable that aluminum oxide is incorporated in the range of 10 to 25% by weight and, by adopting the amount in this range, the glass transition point and the softening point can be retained low, and baking onto a glass substrate can be facilitated.

The incorporation amount of silicon oxide is preferably 5 to 30% by weight, and more preferably 10 to 30% by weight. Silicon oxide is effective in improving the denseness, the strength and the stability of the glass. By adopting the incorporation amount of 5% by weight or more, the thermal expansion coefficient is suppressed small, and the crack is not generated at baking on a glass substrate. By setting the incorporation amount of 30% by weight or less, the glass transition point and the softening point can be suppressed low, and a temperature for baking onto a glass substrate can be lowered.

It is preferable that at least one kind of barium oxide and strontium oxide is used, and the total amount is 2 to 15% by weight, further 2 to 10% by weight. These components are also preferable in denseness. By adopting the total amount of 2% by weight or more, crystallization can be also prevented. In addition, by adopting the total amount of 15% by weight or less, chemical stability of glass can be also maintained.

In addition, zinc oxide may not be contained, but when it is contained up to 5% by weight, the softening point can be lowered. When zinc oxide is more than 5% by weight, the glass becomes unstable.

It is preferable that the average particle diameter of the glass powder is 0.05 to 1 μm. When the particle diameter is smaller than 0.05 μm, a firm matrix is not formed and, when the sintered glass is greater than 1 μm, surface irregularities become great, and this becomes cause for inuniformization of electron emission. When the average particle diameter of the glass powder is within the above-described range, not only the surface irregularities can be reduced, but also a light emission area can be expanded. Further preferable is 0.07 to 0.5 μm.

It is preferable that the glass particle is 0.5 to 500 parts by weight based on 1 part by weight of the electrically conductive particle. When the glass particle is more than 500 parts by weight, good electric contact cannot be obtained. On the other hand, when the glass particle is smaller than 0.05 part by weight, the sufficient adhering property cannot obtained. More preferably, the glass particle is 200 parts by weight or less.

It is preferable that the paste for an electron emission source of the present invention further contains a thermal degradable metal compound. In the present invention, the thermal degradable metal compound represents a compound, which is degraded when a temperature reaches a predetermined temperature, and produces a metal or metal oxide as the degradation product. The thermal degradable metal compound has uniform dispersibility in the paste for electron emission source and is degraded at firing and, as the degradation product, a metal for metal oxide uniformly remains in a CNT emitter. Thereupon, by covering the surface of CNT, the electrically conductive particle or the glass particle with the thermal degradation product to improve adherability between CNT, the electrically conductive particle and the glass particle in the interior of a CNT emitter, uniform adhering property between the CNT emitter and a substrate can be obtained. In addition, when this CNT emitter is subjected to a surface treatment such as tape peeling, the CNT emitter having the surface having small irregularities after treatment can be obtained, being preferable. Further, when the degradation product of the thermal degradable metal compound is a metal or metal oxide having electrical conductivity, the resistance value in the CNT emitter can be reduced, and the contact resistance value between CNT and the cathode electrode can be reduced. The CNT emitter in which the resistance value in the CNT emitter is low, and the contact resistance value between CNT and the cathode electrode is low in the electric field intensity accompanied with field electron emission, and the life of the CNT emitter is long, being particularly preferable.

Examples of a metal element constituting such a thermal degradable metal compound include tin (Sn), indium (In), antimony (Sb), zinc (Zn), gold (Au), silver (Ag), copper (Cu), palladium (Pd), aluminum (Al), titanium (Ti), nickel (Ni), platinum (Pt), manganese (Mn), iron (Fu), cobalt (Co), chromium (Cr), and zirconium (Zn). Among these metal elements, in view of reduction in the contact resistance value between CNT and the cathode electrode, reduction in the threshold voltage, and the manufacturing cost, tin (Sn), indium (In), antimony (Sb), zinc (Zn), and nickel (Ni) are preferable. Among them, it is further preferable that at least one kind selected from tin (Sn), indium (In) and antimony (Sb) is contained.

Examples of the thermal degradable metal compound include an organic metal compound, a metal salt, and a metal complex. Examples of the organic metal compound include a compound having a metal-carbon bond and, as a group contained in an organic chain which binds to a metal element to form the organic metal compound, examples thereof include an acetyl group, an alkyl group, an alkoxy group, an amino group, an amido group, an ester group, an ether group, an epoxy group, a phenyl group, and a halogen group. Specific examples of the organic metal compound include trimethylindium, triethylindium, tributoxyindium, trimethoxyindium, triethoxyindium, tetramethyltin, tetraethyltin, tetrebutyltin, tetramethoxytin, tetraethoxytin, tetrabutoxytin, tetraphenyltin, triphenylantimony, triphenylantimony diacetate, triphenylantimony oxide, and triphenylantimony halide.

Examples of the metal salt include halides such as indium chloride, indium bromide, indium iodide, tin fluoride, tin chloride, tin iodide, antimony fluoride, antimony chloride, antimony bromide, and antimony iodide, acetates such as indium acetate, and tin acetate, nitrates such as indium nitrate, sulfates such as indium sulfate, and tin sulfate, and cyanides such as indium cyanide.

Examples of the metal complex include a metal complex having a structure in which a metal element as a center is coordinated with a ligand at periphery. Examples of the ligand forming the metal complex include ligands having lone electron pairs such as an amino group, a phosphino group, a carboxyl group, a carbonyl group, a thiol group, a hydroxyl group, an ether group, an ester group, an amido group, a cyano group, a halogen group, a thiocyano group, a pyridyl group, and a phenanthryl group. Specific examples of the ligand include triphenylphosphine, nitrate ion, halide ion, hydroxide ion, cyanide ion, thiocyan ion, ammonia, carbon monoxide, acetylacetonate, pyridine, ethylenediamine, bipyridine, phenanthroline, BINAP, catecholate, terpyridine, ethylenediaminetetraacetic acid, porphyrin, cyclam, and crown ethers. Since a metal chelate compound in which a metal element in the metal complex as a center is peripherally coordinated with a ligand having a plurality of coordination positions is such that dispersibility in the paste for an electron emission source is stabilized due to the chelation effect, being further preferable. Specific examples of the metal complex include indium acetylacetonate complex, indium ethylenediamine complex, indium ethylenediaminetetraacetic acid complex, tin acetylacetonate complex, tin ethylenediamine complex, and tin ethylenediamine tetraacetic acid.

The content of the thermal degradable metal compound is preferably 0.1 to 20% by weight, and further more preferably 0.5 to 10% by weight based on the whole paste for an electron emission source. When the content of the thermal degradable metal compound is within the above described range, adhering property between CNT and the cathode substrate becomes better. In addition, the electron emission property such as an electric field intensity and a life is more improved, being particularly preferable.

The paste for an electron emission source of the present invention can conveniently contain a binder resin, a solvent, a dispersant and the like. Examples of the binder resin include cellulose-based resins (ethylcellulose, methylcellulose, nitrocellulose, acetylcellulose, cellulose propionate, hydroxypropylcellulose, butylcellulose, benzylcellulose, modified cellulose etc.), acrylic-based resins (polymers containing at least one kind of monomers such as acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, benzyl acrylate, benzyl methacrylate, phenoxyethyl acrylate, phenoxyethyl methacrylate, isobornyl acrylate, isobornyl methacrylate, glycidyl methacrylate, styrene, α-methylstyrene, 3-methylstyrene, 4-methylstyrene, acrylamide, methacrylamide, acrylonitrile, and methacrylonitrile), ethylene-vinyl acetate copolymer resin, polyvinyl butyral, polyvinyl alcohol, propylene glycol, urethane-based resins, melamine-based resins, phenol resins, and alkyd resins.

As the solvent, a solvent which dissolves an organic component such as a binder resin, and the like is preferable. Examples include a polyhydric alcohol such as a diol and a triol, a representative of which is ethylene glycol and glycerin, a compound obtained by etherizing and/or esterifying an alcohol (ethylene glycol monoalkyl ether, ethylene glycol dialkyl ether, ethylene glycol alkyl ether acetate, diethylene glycol monoalkyl ether acetate, diethylene glycol dialkyl ether, propylene glycol monoalkyl ether, propylene glycol dialkyl ether, propylene glycol alkyl ether acetate). More specifically, terpineol, ethylene glycol monomethyl ether, ethylene glycol monoethyl ether, ethylene glycol monopropyl ether, ethylene glycol monobutyl ether, diethylene glycol dimethyl ether, diethylene glycol diethyl ether, ethylene glycol dipropyl ether, diethylene glycol dibutyl ether, methylcellosolve acetate, ethylcellosolve acetate, propylcellosolve acetate, butylcellosolve acetate, propylene glycol monomethyl ether acetate, propylene glycol monoethyl ether acetate, propylene glycol monopropyl ether acetate, 2,2,4-trimethyl-1,3-pentanediol monoisobutyrate, and butylcarbitol acetate, and an organic solvent mixture contained at least one kind or more of them are used.

The dispersant is preferably an amine-based comb-shaped block copolymer. Examples of the amine-based comb-shaped block copolymer include Solsperse 13240, Solseperse 13650, Solseperse 13940, Solseperse 24000SC, Solseperse 24000GR, and Solseperse 28000 (all trade names) manufactured by Avecia.

The paste for an electron emission source may be imparted photosensitivity and, by containing a photosensitive organic component, patterning procession may be performed through light exposure and development. As the photosensitive organic component, a negative-type photosensitive organic component in which, due to generation of chemical change at irradiation with ultraviolet ray, a component which was soluble in a developer before ultraviolet irradiation becomes insoluble in a developer after light exposure, and a positive-type photosensitive organic component in which a component which was insoluble in a developer before irradiation with ultraviolet ray becomes soluble in a developer after light exposure can be selected. The present invention can be suitably used particularly when the negative-type photosensitive organic component is used. It is preferable that, as the negative-type photosensitive organic component, a photosensitive component selected from at least one kind of a photosensitive polymer, a photosensitive oligomer, and a photosensitive monomer is contained. Further, if necessary, it is preferable that an addition component such as binders, photopolymerization initiators, ultraviolet absorbing agents, sensitizers, sensitization aids, polymerization inhibitors, plasticizers, thickeners, antioxidants, dispersants, organic or inorganic suspending agents and leveling agents is contained.

The photosensitive polymer used in the present invention also has a function as a binder resin. It is preferable that the photosensitive polymer has a carboxyl group. The polymer having a carboxyl group is obtained by selecting carboxyl group-containing monomers such as acrylic acid, methacrylic acid, itaconic acid, crotonic acid, maleic acid, fumaric acid, vinyl acetate, or an acid anhydride thereof, or monomers such as methacrylic acid ester, acrylic acid ester, styrene, acrylonitrile, vinyl acetate, 2-hydroxyacrylate, and the like, and copolymerizing them using an initiator such as azobisisobutyronitrile.

As the polymer having a carboxyl group, a copolymer containing (meth)acrylic acid ester and (meth)acrylic acid as a copolymerization component is preferably used due to a low thermal degradation temperature at firing. In particular, a styrene/methyl methacrylate/methacrylic acid copolymer is preferably used.

It is preferable that a resin acid value of the copolymer having a carboxyl group is 50 to 150 mg KOH/g. When the acid value is greater than 150, a development acceptable width becomes narrow. On the other hand, when the acid value is less than 50, solubility of an unexposed part in a developer is reduced. When a developer concentration is made to be higher, peeling is generated at up to an exposed part, and it becomes difficult to obtain a highly precise pattern.

As a method of introducing an ethylenic unsaturated bond into a side chain, there is a method of making it by reacting an ethylenic unsaturated compound having a glycidyl group or an isocyanate group, or carboxylic acid such as acrylic chloride, methacrylic chloride or allyl chloride, maleic acid and the like with a mercapto group, an amino group, a hydroxyl group or a carboxyl group in the polymer.

Examples of the ethylenic unsaturated compound having a glycidyl group include glycidyl acrylate, glycidyl methacrylate, allyl glycidyl ether, glycidyl ethtyl acrylate, crotonyl glycidyl ether, crotonic acid glycidyl ether, isocrotonic acid glycidyl ether, and the like. In particular, $CH_2=C(CH_3)COOCH_2CHOHCH_2-$ is preferably used.

As the ethylenic unsaturated compound having an isocyanate group, there are (meth) acryloyl isocyanate, (meth) acryloylethyl isocyanate, and the like. In addition, it is preferable that the ethylenic unsaturated compound having a glycidyl group or an isocyanate group, or acrylic acid chloride, methacrylic acid chloride or allyl chloride is reacted at 0.05 to 1 mole equivalent relative to a mercapto group, an amino group, a hydroxyl group or a carboxyl group in the polymer.

For preparing the amine compound having an ethylenic unsaturated bond, glycidyl (meth)acrylate, (meth)acrylic acid chloride, (meth)acrylic acid anhydride or the like may be reacted with an amino compound. A plurality of ethylenic unsaturated group-containing compounds may be used by mixing them.

When the binder component is necessary, as a polymer, polyvinyl alcohol, polyvinyl butyral, methacrylic acid ester polymer, acrylic acid ester polymer, acrylic acid ester-methacrylic acid ester copolymer, butyl methacrylate resin or the like can be used.

As a specific example of the photosensitive monomer, a compound containing a carbon-carbon unsaturated bond having light reactivity can be used. Examples include acrylic acid esters or methacrylic acid esters of alcohols (e.g., ethanol, propanol, hexanol, octanol, cyclohexanol, glycerin, trimethylolpropane, and pentaerythritol), reaction products of carboxylic acids (e.g., acetic acid, propionic acid, benzoic acid, acrylic acid, methacrylic acid, succinic acid, maleic acid, phthalic acid, tartaric acid, and citric acid), and gylcidyl acrylate, glycidyl methacrylate, allylglylcidyl, or tetraglycidyl methoxylilenediamine, amide derivatives (e.g., acrylamide, methacrylamide, N-methylolacrylamine, and methylenebisacrylamide), and reaction products of epoxy compounds and acrylic acid or methacrylic acid. In addition, in a polyfunctional photosensitive monomer, an acryl group, a mathacryl group, a vinyl group, or an allyl group may be present in admixture with an unsaturated group.

In the present invention, one kind or two or more kinds of them may be used. The photosensitive monomer is added in the range of preferably 1 to 90% by weight, more preferably 2 to 80% by weight, further more preferably 2 to 40% by weight, and particularly preferably 5 to 30% by weight based on a total of the photosensitive organic component. When the amount of the photosensitive monomer is too small, light curing is easily deficient, the sensitivity at an exposed part is reduced, and development resistance is reduced. When the amount of the photosensitive monomer is too great, solubility of an unexposed part in water is reduced, and there is a possibility that de-binder deficiency may be caused at firing due to a high crosslinking density.

As a light photopolymerization initiator used in the present invention, an initiator is used by selecting from initiators which generate a radical species. Examples of the photopolymerization initiator include combinations of photoreductive coloring matters such as diethoxyacetophenone, 2-hydroxy-2-methyl-1-phenylpropane-1-one, benzyl dimethyl ketal, 1-(4-isopropylphenyl)-2-hydroxy-2-methylpropane-1-one, 4-(2-hydroxyethoxy) phenyl-(2-hydroxy-2-propyl) ketone, 1-hydroxycyclohexyl-phenylketone, 1-phenyl-1,2-propanedione-2-(o-ethoxycarbonyl) oxime, 2-methyl-[4-(methylthio) phenyl]-2-morpholinopropane-1-one, 2-benzyl-2-dimethylamino-1-(4-morpholinophenyl)-butanone-1, benzoin, benzoin methyl ether, benzoin ethyl ether, benzoin isopropyl ether, benzoin isobutyl ether, benzophenone, methyl o-benzoylbenzoate, 4-phenylbenzophenone, 4,4-dichlorobenzophenone, hydroxybenzophenone, 4-benzoyl-4'-methyl-diphenyl sulfide, alkylated benzophenone, 3,3',4,4'-tetra(t-butylperoxycarbonyl)benzophenone, 4-benzoyl-N,N-dimethyl-N-[2-(1-oxo-2-propenyloxy)ethyl]benzene methnaminium bromide, (4-benzoylbenzyl)trimethylammonium chloride, 2-hydroxy-3-(4-benzoylphenoxy)-N,N,N-trimethyl-1-propeneaminium chloride monohydrate, 2-isopropylthioxanthone, 2,4-dimethylthioxanthone, 2,4-diethylthioxanthone, 2,4-dichlorothioxanthone, 2-hydroxy-3-(3,4-dimethyl-6-oxo-9H-thioxanthen-2-yloxy)-N,N,N-trimethyl-1-propanaminium chloride, 2,4,6-trimethylbenzoylphenylphosphine oxide, 2,2'-bis(o-chlorophenyl)-4,5,4',5'-tetraphenyl-1,2-biimidazole, 10-butyl-2-chloroacridone, 2-ethylanthraquinone, benzil, 9,10-phenanthrenequinone, camphorquinone, methylphenylglyoxy ester, η5-cyclopentadienyl-η6-cumenyl-iron (1+)-hexafluorophosphite (1−), diphenyl sulfide derivative, bis(η5-2,4-cyclopentadien-1-yl)-bis(2,6-difluoro-3-(1H-pyrrol-1-yl)-phenyl)titanium, 4,4-bis(dimethylamino)benzophenone, 4,4-bis(diethylamino)benzophenone, thioxanthone, 2-methylthioxanthone, 2-chlorothioxanthone, 4-benzoyl-4-methyl phenyl ketone, dibenzyl ketone, fluorenone, 2,3-diethoxyacetophenone, 2,2-dimethoxy-2-phenyl-2-phenylacetophenone, 2-hydroxy-2-methylpropylphenone, p-t-butyldichloroacetophenone, benzylmethoxyethylacetal, anthraquinone, 2-t-butylanthraquinone, 2-aminoanthraquinone, β-chloroanthraquinone, anthrone, benzanthrone, dibenzsuberone, methyleneanthrone, 4-azidobenzalacetophenone, 2,6-bis(p-azidobenzylidene)cyclohexane, 2,6-bis(p-azidobenzylidene)-4-methylcyclohexanone, 2-phenyl-1,2-butadione-2-(o-methoxycarbonyl)oxime, 1,3-diphenylpropanetrione-2-(o-ethoxycarbonyl)oxime, N-phenylglycine, tetrabutylammonium (+1)n-butyltriphenyl borate (1−), naphthalenesulfonyl chloride, quinolinesulfonyl chloride, N-phenylthioacryldone, 4,4-azobisisobutyronitrile, benzthiazole disulfide, triphenylphosphine, carbon tetrabromide, tribromophenylsulfone, benzoyl peroxide and eosine, methylene blue, and the like, and reducing agents such as ascorbic acid, triethanolamine and the like.

In the present invention, one kind or two or more kinds of them may be used. The photopolymerization initiator is added in the range of 0.05 to 50% by weight, more preferably 0.05 to 40% by weight, further more preferably 0.05 to 10% by weight, and particularly preferably 0.1 to 10% by weight based on the photosensitive organic component. When the amount of the polymerization initiator is too small, the light sensitivity becomes worse and, when the amount of the light polymerization initiator is too large, there is a possibility that the remaining rate of an exposed part becomes small.

The sensitizer can be used together with the polymerization initiator, the sensitivity can be improved, and the effective wavelength range in the reaction can be extended.

Specific examples of the sensitizer include 2,4-dimethylthioxanthone, 2,4-diethylthioxanthone, 2-isopropylthioxanthone, 2,3-bis(6-diethylaminobenzal)cyclopentanone, 2,6-bis(4-dimethylaminobenzal)cyclohexanone, 2,6-bis(4-dimethylaminobenzal)-4-methylhexanone, Michler's ketone, 4,4-bis(diethylamino)benzophenone, 4,4-bis(dimethylamino)chalcone, 4,4-bis(diethylamino)chalcone, p-dimethylaminocinnamylideneindanone, p-dimethylaminobenzylideneindanone, 2-(p-dimethylaminophenylvinylene) isocyanate, 1,3-bis(4-dimethylaminophenylvinylene)isonaphthothiazole, 1,3-bis(4-dimethylaminobanzal) acetone, 1,3-carbonylbis(4-diethylaminobenzal)acetone, 3,3-carbonylbis(7-diethylaminocoumarin), triethanolamine, methyldiethanolamine, triisopropanolamine, N-phenyl-N-ethylethanolamine, N-phenylethanolamine, N-tolyldiethanolamine, methyl 4-dimethylaminobenzoate, ethyl 4-dimethylaminobenzoic acid), isoamyl dimethylaminobenzoate, isoamyl diethylaminobenzoate, (2-dimethylamino)ethyl benzoate, (n-butoxy)ethyl 4-dimehylaminobenzoate, 2-ethylhexyl 4-dimethylaminobenzoate, 3-phenyl-5-benzoylthiotetrazole, 1-phenyl-5-ethoxycarbonylthiotetrazole, and the like.

In the present invention, one kind or two or more kinds of them can be used. In addition, among sensitizers, there are those that can be also used as the photopolymemrization initiators. When the sensitizer is added to the photosensitive paste of the present invention, its addition amount is usually 0.05 to 50% by weight, more preferably 0.05 to 40% by weight, further more preferably 0.05 to 10% by weight, and particularly preferably 0.1 to 10% by weight based on the photosensitive organic component. When the amount of the sensitizer is too small, there is a possibility that the effect of improving the light sensitivity is not exerted, and when the amount of the sensitizer is too large, the remaining rate of an exposed part may be small.

In the present invention, an ultraviolet absorbing agent and/or a polymerization inhibitor may be possessed. By performing processing of an electron emission source pattern using this paste for an electron emission source, the residue containing a carbon nanotube remaining on a gate electrode, around an emitter hole, or in an emitter hole after development can be considerably decreased. The residue referred herein indicates the paste for an electron emission source, which could not be removed at development, and remains on parts other than an electron emission source pattern.

As the ultraviolet absorbing agent, an organic dye having ultraviolet absorption in the range of the wavelength region 300 to 550 nm is preferable, and an organic dye having the maximum absorption wavelength ($\lambda$max) of an ultraviolet absorption spectrum in the range of a wavelength 300 to 550 nm is further preferable. By using an organic dye having ultraviolet absorption in this wavelength region, it becomes possible to suppress light scattering in the interior of the paste for an electron emission source at ultraviolet irradiation. Thereby, since photocuring at a non-ultraviolet irradiated part is suppressed, the residue containing a carbon nanotube at parts other than an electron emission source pattern can be considerably decreased.

Specific examples of the ultraviolet absorbing agent include an azo-based agent, a benzophenone-based agent, a benzotriazole-based agent, a coumarin-based agent, a xathene-based agent, a quinoline-based agent, an anthraquinone-based agent, a benzoate-based agent, a benzoin-based agent, a cinnamic acid-based agent, a salicylic acid-based agent, a hindered amine-based agent, a cyanoacrylate-based agent, a triazine-based agent, an aminobenzoic acid-based agent, and a quinine-based agent, and one kind or a combination of plural of them can be used, being not limiting.

An organic nitrogen compound having an azo bond has the wide absorption wavelength region of ultraviolet ray, and has good thermal degradability, and therefore, it is particularly preferably used. Specific examples of the compound having an aromatic ring structure and an azo bond include "Sudan I", "Sudan Black B", "Sudan Red 7B", "Sudan II", "Sudan IV" (all trade names, manufactured by Tokyo Chemical Industry Co., Ltd.), azobenzene, aminoazobenzene, dimethylaminoazobenzene, and hydroxyazobenzene, and one kind or a combination of plural of them can be used. In addition, an organic nitrogen compound having a banzotriazole structure has the wide absorption wavelength region of ultraviolet ray, and has sublimating property; therefore, it is particularly preferably used.

The content of the ultraviolet absorbing agent based on the photosensitive organic component in the paste for an electron emission source is preferably 0.001 to 10% by weight, more preferably 0.01 to 5% by weight. When the content is less than 0.001% by weight, the addition effect of the ultraviolet absorbing agent is decreased. On the other hand, when the content exceeds 10% by weight, the transmittance of exposure light is reduced in some cases and, in that case, the film thickness is reduced. When the film thickness becomes small, the sufficient amount of the carbon nanotube does not remain in the electron emission source.

No only the ultraviolet absorbing agent, but also the polymerization inhibitor may be used, specific examples include hydroquinone, a monoesterified compound of hydroquinone, N-nitrosodiphenylamine, phenothiazine, p-t-butylcatechol, N-phenylnaphtylamine, 2,6-di-t-butyl-p-methylphenol, chloranil, and pyrogallol, and one kind or a combination of plural of them can be used, being not limiting.

It is preferable that the molecular weight of the polymerization inhibitor used in the present invention is 500 or less. When the molecular weight exceeds 500, like the ultraviolet absorbing agent, a thermal degradation temperature is shifted to a high temperature side in some cases, and degradation cannot be performed at firing of the paste for an electron emission source. When an undegraded organic substance remains in the electron emission source, this leads to deterioration in a vacuum degree in a display panel or in a backlight panel using an electron emission element manufactured with the paste of the present invention, and deteriorates a life of the electron emission element.

The content of the polymerization inhibitor based on the photosensitive organic component in the paste for an electron emission source is preferably 0.01 to 10% by weight, more preferably 0.02 to 5% by weight. When the content is less than 0.01% by weight, the effect of the polymerization inhibitor is not obtained, and when the content exceeds 10% by weight, photopolymerization may be inhibited in some cases.

By combining the ultraviolet absorbing agent and the polymerization inhibitor, a radical generated by ultraviolet ray which could not be absorbed by the ultraviolet absorbing agent and was scattered, is captured by the polymerization inhibitor, and photocuring at a non-ultraviolet irradiated part is suppressed. Therefore, the residue containing the carbon nanotube at parts other than the electron emission source pattern can be considerably decreased, being preferable.

When the ultraviolet absorbing agent and the polymerization inhibitor are used by combining them, the content of the ultraviolet absorbing agent based on the photosensitive organic component in the paste for an electron emission source is preferably 0.05 to 5% by weight, and further more preferably 0.1 to 2% by weight. The content of the polymerization inhibitor is preferably 0.1 to 10% by weight, and more preferably 0.5 to 5% by weight. The total content of the ultraviolet absorbing agent and the polymerization inhibitor based on the photosensitive organic component is preferably 0.01 to 10% by weight, and more preferably 0.1 to 5% by weight and, when the weight ratio of the ultraviolet absorbing agent and the polymerization inhibitor is the range of 1:10 to 10:1, the synergistic effect is obtained, thus being preferable.

The paste for an electron emission source can be made by blending various components to a predetermined composition, and uniformly mixing and dispersing them with a kneading machine such as a three-roller, a ball mill, a beads mill, and the like. The paste viscosity is arbitrarily adjusted by an addition ratio of glass powders, electrically conductive particles, thickeners, organic solvents, plasticizers and suspending agents, and the range thereof is 2 to 200 Pa·s. For example, coating on a substrate is performed by a spin coating method or a spraying method in addition to a slit die coater method or a screen printing method, and 0.001 to 5 Pa·s is preferable.

A process for manufacturing an electron emission element for triode-type and diode-type field emission using the paste for a photosensitive electron emission source of the present invention will be described below. For manufacturing the electron emission element, other known process may be used, being not limiting to a manufacturing process described later.

First, a process for manufacturing a rear substrate for a triode-type electron emission element will be described. An electrically conductive film such as ITO and the like is formed on a glass substrate such as a soda glass, and PD200 manufactured by ASAHI GLASS CO., LTD., which is a heat resistant glass for PDP (plasma display panel), to form a cathode electrode. Then, an insulating material is coated 5 to 15 µm by a printing method to make an insulating layer. Then, a gate electrode layer is formed on an insulating layer by a vacuum deposition method. A resist is coated on the gate electrode layer, and the gate electrode and the insulating layer are etched by light exposure and development, thereby, an emitter hole pattern is prepared. Thereafter, a paste for an electron emission source is coated with screen printing or a slit die coater. After upper side exposure or rear side exposure, development is performed to form an electron emission source pattern in an emitter hole, and this is fired in the air or in the nitrogen atmosphere at 400 to 500° C. Finally, a CNT film is subjected to raising treatment by a laser irradiation method or a tape peeling method. Then, a front substrate is manufactured. A film of ITO is formed on a glass substrate such as a soda lime glass and PD200 manufactured by ASAHI GLASS CO., LTD., which is a heat resistant glass for PDP to form an anode electrode. Red, green and blue fluorescent materials are coated on the anode electrode by a printing method. The rear substrate and the front substrate are applied holding a spacer glass, and vacuum discharge air is performed through a tube connected to a container, thereby, a triode-type electron emission element is manufactured. The voltage of 1 to 5 kV is supplied to the anode electrode in order to confirm the electron emission state, thereby, electrons are emitted from CNT, and fluorescent light emission can be obtained.

When a rear plate for a diode-type electron emission element is prepared, a paste for an electron emission source is printed on the cathode electrode in a predetermined pattern with screen printing or a slit die coater. This pattern is heated in the atmospheric air or in the nitrogen atmosphere at a temperature of 400 to 500° C., a CNT film is obtained, and the CNT film is subjected to raising treatment by a tape peeling method or a laser treating method. A fluorescent material is printed on a glass substrate on which ITO has been freshly spattered to manufacture an anode substrate. These two glass substrates are laminated by holding a spacer, and vacuum is performed through a discharge air tube connected to a container, thereby, a diode-type electron emission element is manufactured. The voltage of 1 to 5 kV is supplied to the anode electrode in order to confirm an electron emission state, thereby, electrons are emitted from CNT, and fluorescent light emission can be obtained.

EXAMPLES

The present invention will be specifically explained below by way of Examples, and however, the present invention is not limited thereto. Raw materials used are as follows.

CNT1: double-walled CNT manufactured by TORAY Industries, Inc., average diameter 1.2 nm
CNT2: double-walled CNT manufactured by TORAY Industries, Inc., average diameter 4.8 nm
CNT3: Multi-walled CNT manufactured by TORAY Industries, Inc., average diameter 6.5 nm
CNT4: Multi-walled CNT manufactured by TORAY Industries, Inc., average diameter 8.6 nm
CNT5: Multi-walled CNT manufactured by TORAY Industries, Inc., average diameter 12 nm
Electrically conductive particle 1: White electrically conductive powder (spherical titanium oxide is a core, and this is covered with a $SnO_2$/Sb electrically conductive layer), manufactured by ISHIHARA SANGYO KAISHA, LTD, ET-500W, specific surface area 6.9 $m^2$/g, density 4.6 $g/cm^3$, average particle diameter 0.19 µm
Electrically conductive particle 2: Silver powder, manufactured by MITSUI MINING & SMELTING CO., LTD., FHD, specific surface area 2.54 $m^2$/g, density 10.5 $g/cm^3$, average particle diameter 0.22 µm
Electrically conductive particle 3: Silver powder, manufactured by MITSUI MINING & SMELTING CO., LTD., SPQ05S, specific surface area 1.08 m²/g, density 10.5 g/cm³, average particle diameter 0.53 μm Electrically conductive particle 4: Silver powder, manufactured by MITSUI MINING & SMELTING CO., LTD., 350, specific surface area 0.8 m²/g, density 10.5 g/cm³ average particle diameter 0.78 μm Electrically conductive particle 5: White electrically conductive powder (spherical titanium oxide is a core, and the core is covered with a $SnO_2$/Sb electrically conductive layer), manufactured by ISHIHARA SANGYO KAISHA, LTD., ET-300W, specific surface area 28 m²/g, density 5 g/cm³, average particle diameter 0.04 μm Electrically conductive particle 6: Silver powder, manufactured by MITSUI MINING & SMELTING CO., LTD., SPN10J, specific surface area 0.52 m²/g, density 10.5 g/cm², average particle diameter 1.1 μm Glass powder 1: Bismuth-based glass (bismuth oxide: 84% by weight, boron oxide: 7% by weight, silicon oxide: 1% by weight, zinc oxide: 8% by weight) softening point 380° C., average particle diameter 0.6 μm Glass powder 2: Average particle diameter 0.3 μm product of glass powder 1

Glass powder 3: Bismuth-based glass (bismuth oxide: 50% by weight, boron oxide: 21% by weight, silicon oxide: 7% by weight, zinc oxide: 22% by weight), softening point 447° C., average particle diameter 0.4 μm Glass powder 4: Average particle diameter 0.1 μm product of glass powder 3

Glass powder 5: Bismuth-based glass (bismuth oxide: 75% by weight, boron oxide: 0.9% by weight, silicon oxide: 1.9% by weight, zinc oxide: 12% by weight, aluminum oxide: 0.2% by weight, sodium oxide: 4% by weight), softening point 394° C., average particle diameter 0.5 μm Glass powder 6: Bismuth-based glass (bismuth oxide: 85% by weight, boron oxide: 4% by weight, silicon oxide: 1.5% by weight, zinc oxide: 9.5% by weight), softening point 415° C., average particle diameter 0.8 μm Glass powder 7: Alkali-based glass (boron oxide: 35% by weight, aluminum oxide: 22.7% by weight, silicon oxide: 12.9% by weight, lithium oxide: 12.4% by weight, magnesium oxide: 6.4% by weight, barium oxide: 4.2% by weight, potassium oxide: 4.1% by weight, zinc oxide: 2.3% by weight), softening point 458° C., particle diameter 0.7 μm Glass powder 8: Average particle diameter 1.3 μm product of glass powder 6

Binder resin solution 1: Solution in which ethylcellulose (about 49% of ethoxy) 100 manufactured by Wako Pure Chemical Industries, Ltd. is dissolved in terpineol to 30% by weight Binder resin solution 2: Solution in which a product obtained by addition-reacting 0.4 equivalent of glycidyl methacrylate to a carboxyl group of a copolymer consisting of methacrylic acid/methyl methacrylate/styrene=40/40/30 (weight average molecular weight 43,000, acid value 100) is dissolved in terpineol to 40% by weight Photosensitive monomer: Tetrapropylene glycol dimethacrylate Photopolymerization initiator: Irgacure 369 (2-benzyl-2-dimethylamino-1-(4-morpholinophenyl)butanone-1) manufactured by Ciba Specialty Chemicals, Ltd.

Thermal degradable metal compound 1: Nickel acetylacetonate complex

Thermal degradable metal compound 2: Zinc acetylacetonate complex

Thermal degradable metal compound 3: Tetrabutoxytin

Thermal degradable metal compound 4: Tin acetylacetonate complex

Thermal degradable metal compound 5: Indium acetylacetonate complex

Thermal degradable metal compound 6: Triphenyl antimony

Measurement of Average Diameter of CNT

From an image observed with a transmission electron microscope model H7100 manufactured by Hitachi, Ltd. at magnification of 2,000,000, ten places of CNT were randomly selected, and the average thereof was adopted as an average diameter of CNT.

Measurement of Particle Diameter of Electrically Conductive Particle

The average particle diameter (μm) of the electrically conductive particle used was calculated by the following equation using the density (g/cm³) from the specific surface area (m²/g) with a fluid-process type BET single point method specific surface area measuring apparatus (manufactured by Yuasa Ionics Inc., MONOSORB) using $N_2$ as an adsorption gas, and $N_2$/He=30/70 as a carrier gas. Average particle diameter=6/(density×specific surface area)

Measurement of Particle Diameter of Glass Powder

The accumulation 50% particle diameter of the glass powder used was measured using a particle diameter distribution measuring apparatus (manufactured by NIKKISO CO., LTD, Microtrack 9320 HRT). Measurement of softening point of glass powder The softening point of the glass powder used was measured using a thermal machine analyzing apparatus (manufactured by Seiko Instruments Inc., EXTER6000TMA/SS). The glass particle was melted at 800° C., and processed into a rod having a diameter of 5 mm and the height of 2 cm, which was used as a measurement sample. A weight of each 10 g-weight was applied to a glass rod of the measurement sample and a quarts glass rod of a standard sample, a temperature was raised from room temperature at 10° C./min, and a temperature at the maximum length of the resulting TMA curve was adopted as softening point.

Measurement of Contact Resistance Between Electron Emission Element Surface and Electrode Using a scanning extension resistance microscope (NanoScopeIIIa AFM Dimension3100 Stage system manufactured by Veeco, Digital Instruments), a CoCr-coated silicon cantilever was contacted with an emitter surface, and a DC bias of −0.5V was applied to a cathode electrode. A resistance value was measured in a 3 μm×4 μm plane, and its in-plane average was adopted as a contact resistance value. When the contact resistance is $10^9 \Omega$ or less, it was found to be good.

Measurement of Surface Roughness Rz

A ten points average roughness, Rz of the surface of the electron emission element was measured using Surfcom 1400 manufactured by TOKYO SEIMITSU CO., LTD. in a sensing pin manner according to JIS B0601-1982. When the surface roughness Rz is 1 μm or less, it was determined to be good.

Evaluation of Adhering Property

An adhesive tape having a peeling adhesion strength of 0.1 N/20 mm, 0.5 N/20 mm, or 1 N/20 mm was applied to a CNT film formed on a cathode electrode, respectively. Adhering property between the CNT film and the cathode electrode was assessed by peeling this tape at the rate of 300 mm/min while an angle of approximately 180° was retained. When the adhering force between the CNT film and the cathode electrode is weak, and a cathode electrode surface is seen by peeling the CNT film by tape peeling at 0.1 N/20 mm, this was determined to be ×, when the CNT film is peeled by tape peeling at 0.5 N/20 mm, and a cathode electrode surface is seen, this was determined to be Δ, when a cathode electrode surface is seen by peeling the CNT film by tape peeling at 1 N/20 mm, this was determined to be o, and when peeling of the CNT film by any tape peeling is not seen, this was determined to be ⊙.

Measurement of Light Emitting Area

In a vacuum chamber having a vacuum degree of $5 \times 10^{-4}$ Pa, a rear substrate in which an electrode emission element of 1 cm×1 cm square was formed on an ITO substrate, and a front substrate in which a fluorescent layer (P22) having the thickness of 5 μm was formed on an ITO substrate were confronted holding a gap film of 100 μm. The voltage of 0.5 kV was applied with a voltage application apparatus (voltage resistant/insulating resistance tester TOS9201 manufactured by KIKUSUI ELECTRONICS CORPORATION) to make the front substrate emit light. The light emitting area was digitalized by taking an emitting image with a CCD camera, and measuring a ratio of a light emitting part in an electron emission element of 1 cm×1 cm.

Measurement of Electric Field Intensity Reaching 1 mA/cm$^2$

In a vacuum chamber having a vacuum degree of $5 \times 10^{-4}$ Pa, a rear substrate in which an electron emission element of 1 cm×1 cm square was formed on an ITO substrate, and a front substrate on which a fluorescent layer (P22) having the thickness of 5 μm formed on ITO substrate were confronted holding a gap film of 100 μm. The voltage was applied at 0.25 V/sec with a voltage application apparatus (voltage resistant/insulating resistance tester TOS9201 manufactured by KIKUSUI ELECTRONICS CORPORATION). From the resulting current voltage curve (maximum current value 10 mA/cm$^2$), the electric field intensity reaching 1 mA/cm$^2$ was obtained. Second time measurement of the electric field intensity reaching 1 mA/cm$^2$ was performed similarly after first measurement. As a difference between first and second electric field intensities reaching 1 mA/cm$^2$ is smaller, it is better. In addition, when the value of the electric field intensity is smaller, the electron emission property is better.

Examples 1 to 9

The paste for an electron emission source of the present invention was prepared by the following procedure. After 1 g of CNT, and an electrically conductive particle at a ratio relative to 1 g of CNT described in Table 1 were weighed in a zirconia container of the volume of 500 ml, 70 g of a binder solution 1, and 26 g of first grade terpineol (isomer mixture, manufactured by Tokyo Chemical Industry Co., Ltd.) which is a solvent were added. To this was added 0.3 μm φ zirconia beads (Torayceram (tradename) manufactured by TORAY Industries, Inc.), and the mixture was pre-dispersed at 100 rpm with a planetary ball mill (planetary ball mill P-5 manufactured by Fritsch Japan Co., Ltd.). Then, a mixture from which zirconia beads had been removed was kneaded with a three-roller to obtain a paste for an electron emission source.

Subsequently, an electron emission element was manufactured by the following procedure. A film of ITO was formed on a glass substrate by spattering to form a cathode electrode. The paste for an electron emission source was printed on the resulting cathode electrode in a 1 cm square pattern by screen printing. This was heated at a temperature of 450° C. in nitrogen to obtain an electron emission element. This CNT film was subjected to raising treatment with a tape having a peeling adhesion strength of 0.1 N/20 mm. Results of measurement of a contact resistance, a surface roughness, the adhering property, and an electric field intensity reaching 1 mA/cm$^2$ are shown in Table 1.

TABLE 1

| | | Example 1 | Example 2 | Example 3 | Example 4 | Example 5 | Example 6 | Example 7 | Exampe 8 | Example 9 |
|---|---|---|---|---|---|---|---|---|---|---|
| Component | CNT (Type) | | | | CNT1 | | | | CNT2 | CNT3 |
| | Electrically conductive particle (Type) | 1 | 2 | 3 | 4 | 1 | 1 | 1 | 1 | 1 |
| | CNT/Electrically conductive particle (weight ratio) | 1/3 | 1/3 | 1/3 | 1/3 | 1/0.5 | 1/10 | 1/50 | 1/3 | 1/3 |
| | Binder resin (Type) | | | | Binder resin solution 1 70 g | | | | | |
| | Solvent (Type) | | | | Solvent (first grade terpineol) 26 g | | | | | |
| Result | Contact resistance (Ω) | $10^8$ | $10^7$ | $10^6$ | $10^6$ | $10^9$ | $10^9$ | $10^8$ | $10^7$ | $10^7$ |
| | Surface roughness Rz (μm) | 0.3 | 0.3 | 0.6 | 0.8 | 0.3 | 0.3 | 0.4 | 0.3 | 0.3 |
| | Adhering property | Δ | Δ | Δ | Δ | Δ | Δ | Δ | Δ | Δ |
| | Electric field intensity reaching 1 mA/cm$^2$ (V/μm) First time | 3.4 | 3.3 | 3.3 | 3.2 | 3.6 | 3.5 | 3.5 | 3.9 | 4.3 |
| | Electric field intensity reaching 1 mA/cm$^2$ (V/μm) Second time | 3.8 | 4.8 | 4.3 | 4.3 | 3.8 | 3.9 | 4.1 | 4.3 | 4.6 |

Examples 10 to 19

After one gram of CNT, an electrically conductive particle at the ratio described in Table 2 based on 1 g of CNT and a glass powder at the ratio described in Table 2 based on 1 g of the electrically conductive particle were weighed in a zirconia container of the volume of 500 ml, 70 g of a binder solution 1, and 26 g of a solvent (first grade terpineol (isomer mixture, manufactured by Tokyo Chemical Industry Co., Ltd.)) were added, and a paste for an electron emission source and an electron emission element were manufactured as in Example 1. Results of measurement of a contact resistance, a surface roughness, the adhering property, a light emitting area, and the electric field intensity reaching 1 mA/cm² are shown in Table 2.

TABLE 2

|   |   | Example 10 | Example 11 | Example 12 | Example 13 | Example 14 | Example 15 | Example 16 | Example 17 | Example 18 | Example 19 |
|---|---|---|---|---|---|---|---|---|---|---|---|
| Component | CNT (Type) | | | | | CNT1 | | | | | |
| | Electrically conductive particle (Type) | | | | | Electrically conductive particle 1 | | | | | |
| | CNT/Electrically conductive particle (weight ratio) | 1/3 | 1/3 | 1/3 | 1/3 | 1/3 | 1/3 | 1/3 | 1/3 | 1/0.3 | 1/0.1 |
| | Glass Type | 1 | 2 | 3 | 4 | 5 | 6 | 7 | 2 | 2 | 2 |
| | powder Particle diameter (μm) | 0.6 | 0.3 | 0.4 | 0.1 | 0.5 | 0.8 | 0.7 | 0.3 | 0.3 | 0.3 |
| | Electrically conductive particle/Glass powder (weight ratio) | 1/1 | 1/1 | 1/1 | 1/1 | 1/1 | 1/1 | 1/1 | 1/0.5 | 1/200 | 1/500 |
| | Binder resin (Type) | | | | | Binder resin solution 1 70 g | | | | | |
| | Solvent (Type) | | | | | Solvent (first grade terpineol) 26 g | | | | | |
| Result | Contact resistance (Ω) | $10^9$ | $10^9$ | $10^9$ | $10^9$ | $10^9$ | $10^9$ | $10^9$ | $10^9$ | $10^9$ | $10^9$ |
| | Surface roughness Rz (μm) | 0.7 | 0.4 | 0.6 | 0.2 | 0.6 | 0.8 | 0.7 | 0.4 | 0.3 | 0.3 |
| | Adhering property | ○ | ○ | ○ | ○ | ○ | ○ | ○ | ○ | ◎ | ◎ |
| | Electric field intensity reaching 1 mA/cm² (V/μm) First time | 3.5 | 3.5 | 3.5 | 3.5 | 3.5 | 3.5 | 3.5 | 3.4 | 3.5 | 3.7 |
| | Second time | 3.9 | 3.9 | 3.9 | 3.9 | 3.9 | 3.9 | 3.9 | 3.9 | 4.2 | 4.5 |

Examples 20 to 23

After 1 g of CNT, an electrically conductive particle at the ratio described in Table 3 based on 1 g of CNT, and a glass powder at the ratio described in Table 3 based on 1 g of the electrically conductive particle were weighed in a zirconia container of the volume of 500 ml, 60 g of a binder solution 2, 1 g of a photosensitive monomer, 1 g of a photopolymerization initiator, and 30 g of a solvent (first grade terpineol (isomer mixture, manufactured by Tokyo Chemical Industry Co., Ltd.)) were added, and a paste for an electron emission source was prepared as in Example 1.

Then, a film of ITO was formed on a glass substrate to form a cathode electrode. The resulting paste for an electron emission source was printed on the resulting cathode electrode in a 5 cm square pattern by screen printing. Then, this was exposed with ultraviolet ray with an ultrahigh pressure mercury lump of an output of 50 mW/cm² from an upper side using a negative-type chromium mask so as to be 1 cm square pattern. Then, this was developed by spraying a 1 wt % sodium carbonate aqueous solution with shower for 150 seconds, and this was washed with water using shower spray to remove a part which had not been photocured. The pattern obtained herein was heated at a temperature of 450° C. in nitrogen to manufacture an electron emission element. This CNT film was subjected to raising treatment with a tape having a peeling adhesion strength of 0.1 N/20 mm. Results of measurement of a contact resistance, a surface roughness, the adhering property, a light emitting area, and the electric field intensity reaching 1 mA/cm² are shown in Table 3.

TABLE 3

|   |   | Example 20 | Example 21 | Example 22 | Example 23 |
|---|---|---|---|---|---|
| Component | CNT (Type) | | CNT1 | | |
| | Electrically conductive particle (Type) | | Electrically conductive particle 1 | | |
| | CNT/Electrically conductive particle (weight ratio) | 1/3 | 1/3 | 1/3 | 1/0.3 |
| | Glass powder Type | 1 | 2 | 2 | 2 |
| | Particle diameter (μm) | 0.6 | 0.3 | 0.3 | 0.3 |

TABLE 3-continued

|  | | Example 20 | Example 21 | Example 22 | Example 23 |
|---|---|---|---|---|---|
| | Electrically conductive particle/Glass powder (weight ratio) | 1/1 | 1/1 | 1/0.5 | 1/200 |
| | Binder resin (Type) | Binder resin solution 2 60 g | | | |
| | Photosensitive monomer (Type) | Photosensitive monomer (Tetrapropylene glycol dimethacrylate) 1 g | | | |
| | Additive (Type) | Photopolymerization initiator (Irgacure 369) 1 g | | | |
| | Solvent (Type) | Solvent (first grade terpineol) 30 g | | | |
| Result | Contact resistance (Ω) | $10^9$ | $10^9$ | $10^9$ | $10^9$ |
| | Surface roughness Rz (μm) | 0.7 | 0.4 | 0.4 | 0.3 |
| | Adhering property | ○ | ○ | ○ | ◎ |
| | Electric field intensity reaching 1 mA/cm² (V/μm)  First time | 3.4 | 3.4 | 3.4 | 3.4 |
| | Second time | 3.7 | 3.8 | 3.8 | 4 |

Comparative Example 1

According to the same manner as that of Example 1 except that the electrically conductive particle is not added, a paste for an electron emission source and an electron emission element were manufactured. Results of measurement of a contact resistance, a surface roughness, the adhering property, and the electric field intensity reaching 1 mA/cm² are shown in Table 4.

TABLE 4

|  | | Comparative Example 1 | Comparative Example 2 | Comparative Example 3 | Comparative Example 4 | Comparative Example 5 |
|---|---|---|---|---|---|---|
| Component | CNT (Type) | CNT1 | | | | |
| | Electrically conductive particle (Type) | — | 5 | 6 | 5 | 6 |
| | CNT/Electrically conductive particle (weight ratio) | — | 1/3 | 1/3 | 1/3 | 1/3 |
| | Glass powder  Type | — | — | — | 2 | 2 |
| | Particle diameter (μm) | — | — | — | 0.3 | 0.3 |
| | Electrically conductive particle/Glass powder (weight ratio) | — | — | — | 1/1 | 1/1 |
| | Binder resin (Type) | Binder resin solution 1 70 g | | | | |
| | Solvent (Type) | Solvent (first grade terpineol) 26 g | | | | |
| Result | Contact resistance (Ω) | $10^{11}$ | $10^{12}$ | $10^6$ | $10^{14}$ | $10^7$ |
| | Surface roughness Rz (μm) | 0.2 | 0.2 | 1.5 | 0.3 | 1.7 |
| | Adhering property | X | Δ | Δ | ○ | ○ |
| | Electric field intensity reaching 1 mA/cm² (V/μm)  First time | 5.1 | >10 | 3.4 | >10 | 3.5 |
| | Second time | 5.5 | >10 | 4.4 | >10 | 4.4 | for an electron emission source and an electron emission element were manufactured. Results of measurement of a contact resistance, a surface roughness, the adhering property, and the electric field intensity reaching 1 mA/cm² are shown in Table 4.

Comparative Examples 2 and 3

According to the same manner as that of Example 1 except that the electrically conductive particle having the average particle diameter outside the range of 0.1 to 1 μm was used at the ratio described in Table 4, a paste for an electron emission source and an electron emission element were manufactured. Results of measurement of a contact resistance, a surface roughness, the adhering property, and the electric field intensity reaching 1 mA/cm² are shown in Table 4.

Comparative Examples 4 and 5

According to the same manner as that of Example 11 except that the electrically conductive particle having the average particle diameter outside the range of 0.1 to 1 μm was used at the ratio described in Table 4, a paste for an electron emission source and an electron emission element were

Examples 24 to 33

After 1 g of CNT, an electrically conductive particle at the ratio described in Table 5 based on 1 g of CNT, a glass powder at the ratio described in Table 5 based on 1 g of the electrically conductive particle, and a thermal degradable metal compound at the ratio described in Table 5 based on 1 g of the glass powder were weighed in a zirconia container of the volume 500 ml, 60 g of a binder solution 2, 1 g of a photosensitive monomer, 1 g of a photopolymerization initiator, and 30 g of a solvent (first grade terpineol (isomer mixture, manufactured by Tokyo Chemical Industry Co., Ltd.)) were added, and a paste for an electron emission source was prepared as in Example 1.

Then, a film of ITO was formed on a glass substrate by sputtering to form a cathode electrode. The resulting paste for an electron emission source was printed on the resulting cathode electrode in a 5 cm square pattern by screen printing. Then, this was exposed with ultraviolet ray with a ultrahigh pressure mercury lamp of an output of 50 mW/cm² from an upper side using a negative-type chromium mask so as to be a 1 cm square pattern. Then, this was developed by spraying a 1 wt % sodium carbonate aqueous solution with shower for 150 seconds, and washed with water using shower spray to remove a part which had not been photocured. The pattern obtained herein was heated at a temperature of 450° C. in nitrogen to manufacture an electron emission element. This CNT film was subjected to raising treatment with a tape having a peeling adhesion strength of 0.1 N/20 mm. Results of measurement of a contact resistance, a surface roughness, the adhering property, and the electric field intensity reaching 1 mA/cm² are shown in Table 5.

Comparative Example 6

According to the same manner as that of Example 1 except that CNT5 was used in place of CNT1, a paste for an electron emission source and an electron emission element were manufactured. Results of measurement of a contact resistance, a surface roughness, the adhering property, and the electric field intensity reaching 1 mA/cm² are shown in Table 6.

TABLE 5

| | | Example 24 | Example 25 | Example 26 | Example 27 | Example 28 | Example 29 | Example 30 | Example 31 | Example 32 | Example 33 |
|---|---|---|---|---|---|---|---|---|---|---|---|
| Component | CNT (Type) | CNT1 | | | | | | | | | |
| | Electrically conductive particle (Type) | Electrically conductive particle 1 | | | | | | | | | |
| | CNT/Electrically conductive particle (weight ratio) | 1/3 | 1/3 | 1/3 | 1/3 | 1/3 | 1/3 | 1/3 | 1/3 | 1/3 | 1/3 |
| | Glass powder Type | 2 | 2 | 2 | 2 | 2 | 2 | 2 | 2 | 2 | 2 |
| | Particle diameter (μm) | 0.3 | 0.3 | 0.3 | 0.3 | 0.3 | 0.3 | 0.3 | 0.3 | 0.3 | 0.3 |
| | Electrically conductive particle/Glass powder (weight ratio) | 1/1 | 1/1 | 1/1 | 1/1 | 1/1 | 1/1 | 1/1 | 1/1 | 1/1 | 1/1 |
| | Thermal degradable metal compound (Type) | 1 | 2 | 3 | 4 | 5 | 6 | 4 | 4 | 4 | 4 |
| | Electrically conductive particle/Thermal degradable metal compound (weight ratio) | 1/1 | 1/1 | 1/1 | 1/1 | 1/1 | 1/1 | 1/0.1 | 1/0.5 | 1/3 | 1/5 |
| | Binder resin (Type) | Binder resin solution 2 60 g | | | | | | | | | |
| | Photosensitive monomer (Type) | Photosensitive monomer (Tetrapropylene glycol dimethacrylate) 1 g | | | | | | | | | |
| | Additive (Type) | Photopolymerization initiator (Irgacure 369) 1 g | | | | | | | | | |
| | Solvent (Type) | Solvent (first grade terpineol) 30 g | | | | | | | | | |
| Result | Contact resistance (Ω) | $10^9$ | $10^9$ | $10^8$ | $10^7$ | $10^7$ | $10^7$ | $10^8$ | $10^7$ | $10^7$ | $10^6$ |
| | Surface roughness Rz (μm) | 0.3 | 0.2 | 0.2 | 0.2 | 0.2 | 0.2 | 0.2 | 0.2 | 0.1 | 0.1 |
| | Adhering property | ◎ | ◎ | ◎ | ◎ | ◎ | ◎ | ◎ | ◎ | ◎ | ◎ |
| | Electric field intensity reaching 1 mA/cm² (V/μm) First time | 3.5 | 3.4 | 2.8 | 2.7 | 2.9 | 2.9 | 3.1 | 2.6 | 2.7 | 3.2 |
| | Second time | 4.0 | 3.7 | 3.0 | 2.9 | 3.0 | 3.1 | 3.3 | 2.8 | 2.9 | 3.5 |

Example 34

According to the same manner as that of Example 1 except that CNT4 was used in place of CNT1, a paste for an electron emission source and an electron emission element were manufactured. Results of measurement of a contact resistance, a surface roughness, the adhering property, and the electric field intensity reaching 1 mA/cm² are shown in Table 6.

Example 35

According to the same manner as that of Example 10 except that a glass powder 8 was used in place of the glass powder 1, a paste for an electron emission source and an electron emission element were manufactured. Results of measurement of a contact resistance, a surface roughness, the adhering property, a light emitting area, and the electric field intensity reaching 1 mA/cm² are shown in Table 6.

Comparative Example 7

According to the same manner as that of Example 11 except that the electrically conductive particle was not added, and a weight ratio of CNT and the glass powder was CNT/glass powder=⅓, a paste for an electron emission source and an electron emission element were manufactured. Results of measurement of a contact resistance, a surface roughness, the adhering property, and the electric field intensity reaching 1 mA/cm² are shown in Table 6.

Comparative Example 8

According to the same manner as that of Comparative Example 7 except that a thermal degradable metal compound 4 was added so that a weight ratio of the glass powder and the thermal degradable metal compound 4 was glass powder/thermal degradable metal compound 4=1/1, a paste for an electron emission source and an electron emission element were manufactured. Results of measurement of a contact resistance, a surface roughness, the adhering property, and the electric field intensity reaching 1 mA/cm² are shown in Table 6.

TABLE 6

|  |  |  | Example 34 | Comparative Example 6 | Comparative Example 7 | Comparative Example 8 |
|---|---|---|---|---|---|---|
| Component | CNT (Type) |  | CNT4 | CNT5 | CNT1 | CNT1 |
|  | Electrically conductive particle (Type) |  | 1 | 1 | — | — |
|  | CNT/Electrically conductive particle (weight ratio) |  | 1/3 | 1/3 | — | — |
|  | Glass powder | Type | — | — | 2 | 2 |
|  |  | Particle diameter (μm) | — | — | 0.3 | 0.3 |
|  | CNT/Glass powder (weight ratio) |  | — | — | 1/3 | 1/3 |
|  | Thermal degradable metal compound (Type) |  | — | — | — | 4 |
|  | Glass powder/Thermal degradable metal compound (weight ratio) |  | — | — | — | 1/1 |
|  | Binder resin (Type) |  | Binder resin solution 1 70 g | | | |
|  | Solvent (Type) |  | Solvent (first grade terpineol) 26 g | | | |
| Result | Contact resistance (Ω) |  | $10^8$ | $10^8$ | $10^{12}$ | $10^{11}$ |
|  | Surface roughness Rz (μm) |  | 0.4 | 0.4 | 0.3 | 0.3 |
|  | Adhering property |  | Δ | Δ | ○ | ◎ |
|  | Electric field intensity reaching 1 mA/cm² (V/μm) | First time | 4.8 | 6.5 | >10 | 5.5 |
|  |  | Second time | 5.2 | 7.1 | >10 | 5.8 |

INDUSTRIAL APPLICABILITY

Since the paste for an electron emission source of the present invention retains good electric contact between CNT and a cathode electrode, field emission is possible even at the low electric field intensity. Therefore, the source can be usefully utilized as an electron emission source for field emission-type display.

The invention claimed is:

1. A paste for an electron emission source comprising a carbon nanotube having a diameter of 1 nm or more and less than 10 nm, and an electrically conductive particle having an average particle diameter of 0.1 to 1 μm, wherein the electrically conductive particle is an oxide particle in which a part or all of the oxide surface is coated with an electrically conductive oxide material.

2. The paste for an electron emission source according to claim 1, which comprises a glass powder.

3. The paste for an electron emission source according to claim 2, wherein the glass powder is a bismuth-based glass and/or an alkali-based glass.

4. The paste for an electron emission source according to claim 2, wherein the average diameter of the glass powder is 0.05 to 1 μm.

5. The paste for an electron emission source according to claim 2, wherein the glass powder is 0.5 to 500 parts by weight based on 1 part by weight of the electrically conductive particle.

6. The paste for an electron emission source according to claim 1, comprising a thermal degradable metal compound.

7. The paste for an electron emission source according to claim 6, wherein a metal contained in the thermal degradable metal compound is at least one kind selected from Sn, In and Sb.

8. The paste for an electron emission source according to claim 6, wherein the thermal degradable metal compound is 0.1 to 20% by weight based on the whole paste for an electron emission source.

9. An electron emission element using the paste for an electron emission source as defined in claim 1.

* * * * *